United States Patent
Park et al.

(10) Patent No.: US 9,295,083 B2
(45) Date of Patent: Mar. 22, 2016

(54) METHOD AND APPARATUS FOR RANDOM-ACCESSING IN WIRELESS COMMUNICATION SYSTEM

(71) Applicant: LG ELECTRONICS INC., Seoul (KR)

(72) Inventors: Sungjun Park, Anyang-si (KR);
Sunghoon Jung, Anyang-si (KR);
Seungjune Yi, Anyang-si (KR);
Youngdae Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 73 days.

(21) Appl. No.: 14/342,721

(22) PCT Filed: Sep. 24, 2012

(86) PCT No.: PCT/KR2012/007640
§ 371 (c)(1),
(2) Date: Mar. 4, 2014

(87) PCT Pub. No.: WO2013/043007
PCT Pub. Date: Mar. 28, 2013

(65) Prior Publication Data
US 2014/0241297 A1    Aug. 28, 2014

Related U.S. Application Data

(60) Provisional application No. 61/538,144, filed on Sep. 23, 2011.

(51) Int. Cl.
*H04W 72/04* (2009.01)
*H04L 12/413* (2006.01)
(Continued)

(52) U.S. Cl.
CPC .......... *H04W 74/0833* (2013.01); *H04W 72/14* (2013.01)

(58) Field of Classification Search
CPC ..... H04W 80/04; H04W 88/04; H04W 72/04; H04W 84/12; H04L 12/413
See application file for complete search history.

(56) References Cited

U.S. PATENT DOCUMENTS

| | | | |
|---|---|---|---|
| 2009/0259910 A1* | 10/2009 | Lee et al. | 714/748 |
| 2009/0268666 A1* | 10/2009 | Vujcic | 370/328 |
| 2010/0074130 A1 | 3/2010 | Bertrand et al. | |

(Continued)

FOREIGN PATENT DOCUMENTS

KR    10-2010-0119453    11/2010

OTHER PUBLICATIONS

LTE, "Evolved Universal Terrestrial Radio Access (E-UTRA); Medium Access Control (MAC) protocol specification (3GPP TS 36.321 version 8.4.0 Release 8)," ETSI TS 136 321 V8.4.0, Jan. 2009, 45 pages (relevant pages: p. 12).

(Continued)

*Primary Examiner* — Andrew Lee
(74) *Attorney, Agent, or Firm* — Lee, Hong, Degerman, Kang & Waimey

(57) ABSTRACT

The present invention relates to a method for performing a random access, more specially, to a method for a terminal performing a random access in a wireless communication system, and comprises a step of transmitting to a base station a random access preamble selected from either a first random access preamble group or a second random access preamble group, wherein the first and second random access preamble groups are discriminated depending one packet type to be transmitted by the terminal.

10 Claims, 11 Drawing Sheets

(51) Int. Cl.
*H04W 74/08* (2009.01)
*H04W 72/14* (2009.01)

(56) References Cited

U.S. PATENT DOCUMENTS

| | | | |
|---|---|---|---|
| 2010/0195579 A1* | 8/2010 | Park et al. | 370/329 |
| 2011/0045837 A1* | 2/2011 | Kim et al. | 455/452.1 |
| 2011/0158104 A1 | 6/2011 | Frenger et al. | |
| 2012/0002555 A1* | 1/2012 | Ohuchi et al. | 370/244 |
| 2012/0163311 A1* | 6/2012 | Park | 370/329 |
| 2013/0044708 A1* | 2/2013 | Kim et al. | 370/329 |
| 2013/0208668 A1* | 8/2013 | Ramos et al. | 370/329 |
| 2013/0294382 A1* | 11/2013 | Xu et al. | 370/329 |
| 2014/0369297 A1* | 12/2014 | Bertrand et al. | 370/329 |

OTHER PUBLICATIONS

Texas Instruments, et al., "Preamble group selection," Change Request 36.321 CR 0240 Rev 2 Current Version: 8.3.0, 3GPP TSG-RAN2 Meeting #64, R2-087387, Nov. 2008, 3 pages.

PCT International Application No. PCT/KR2012/007640, Written Opinion of the International Searching Authority dated Feb. 25, 2013, 11 pages.

PCT International Application No. PCT/KR2012/007640, Written Opinion of the International Searching Authority dated Feb. 25, 2013, 14 pages.

* cited by examiner

FIG. 2
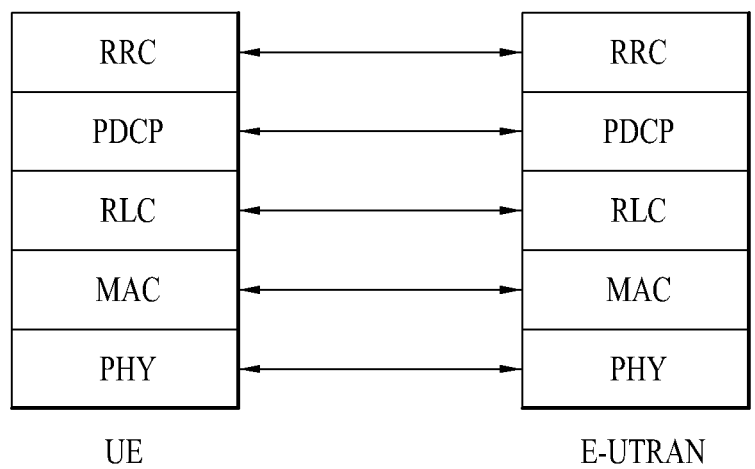
control plane of LTE system radio protocol
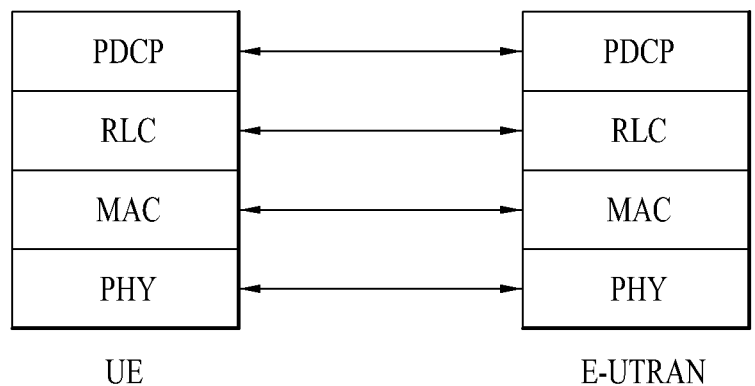
user plane of LTE system radio protocol

METHOD AND APPARATUS FOR RANDOM-ACCESSING IN WIRELESS COMMUNICATION SYSTEM

CROSS-REFERENCE TO RELATED APPLICATIONS

This application is the National Stage filing under 35 U.S.C. 371 of International Application No. PCT/KR2012/007640, filed on Sep. 24, 2012, which claims the benefit of U.S. Provisional Application Ser. No. 61/538,144, filed on Sep. 23, 2011, the content of which are all hereby incorporated by reference herein in their entirety.

TECHNICAL FIELD

The present invention relates to a wireless communication system, and more particularly, to a method of performing a random access and apparatus therefor.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, etc.

DISCLOSURE OF THE INVENTION

Technical Task

The technical task of the present invention is to support a random access efficiently in case of sending an instant message and the like.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first technical aspect of the present invention, provided herein is a method of performing a random access, which is performed by a user equipment in a wireless communication system, the method including transmitting a random access preamble selected from either a first random access preamble group or a second random access preamble group to a base station, wherein each of the first random access preamble group and the second random access preamble group is discriminated depending on a packet type to be transmitted by the user equipment.

In a second technical aspect of the present invention, provided herein is a method of performing a random access, which is performed by a base station in a wireless communication system, the method including receiving a random access preamble from a user equipment, wherein the random access preamble corresponds to either a first random access preamble group or a second random access preamble group and wherein each of the first random access preamble group and the second random access preamble group is discriminated depending on a packet type to be transmitted by the user equipment.

In a third technical aspect of the present invention, provided herein is a user equipment in a wireless communication system, including a receiving module and a processor transmitting a random access preamble selected from either a first random access preamble group or a second random access preamble group to a base station, wherein each of the first random access preamble group and the second random access preamble group is discriminated depending on a packet type to be transmitted by the user equipment.

In a fourth technical aspect of the present invention, provided herein is a base station in a wireless communication system, including a transmitting module and a processor receiving a random access preamble from a user equipment, wherein the random access preamble corresponds to either a first random access preamble group or a second random access preamble group and wherein each of the first random access preamble group and the second random access preamble group is discriminated depending on a packet type to be transmitted by the user equipment.

The following matters may be included in the first to fourth technical aspects of the present invention.

The first random access preamble group and the second random access preamble group may be discriminated depending on a radio bearer.

The first random access preamble group may be associated with a first radio bearer for transmitting an instant message packet and the second random access preamble group may be associated with a second radio bearer for transmitting a packet other than the instant message packet.

The method may further include receiving information on associated relationship among the first random access preamble group, the second random access preamble group, a radio bearer and the packet type from the base station.

The method may further include selecting a random access preamble group for selecting the random access preamble depending on the packet type to be transmitted by the user equipment.

If a RLC (radio link control) layer buffer and a PDCP (packet data convergence protocol) layer buffer are empty and a packet associated with the radio bearer to be transmitted by the user equipment is identified, the user equipment may start to perform the random access.

If a priority of the radio bearer associated with the packet to be transmitted by the user equipment is higher than that of a radio bearer for a packet in the RLC layer buffer and the PDCP layer buffer, the user equipment may start to perform the random access.

Advantageous Effects

According to the present invention, in case of sending an instant message or the like, it is able to efficiently support a random access. Moreover, since a user equipment can inform a base station whether an instant message packet is generated in a step of transmitting a random access preamble, the base station is able to efficiently allocate an uplink resource included in a random access response.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram to describe layers of a radio protocol.

BEST MODE FOR INVENTION

Figure 1:
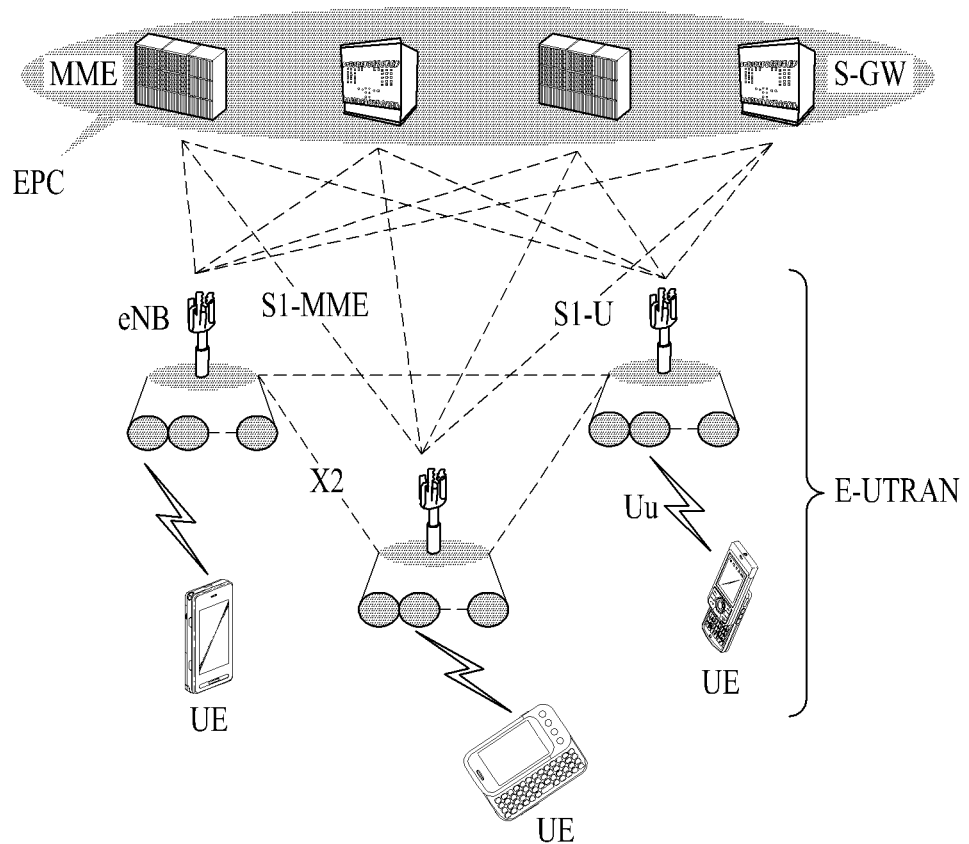
FIG. 1 is a diagram for a schematic structure of an LTE system.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In this specification, embodiments of the present invention are described centering on the data transmission/reception relations between a base station and a terminal. In this case, the base station may be meaningful as a terminal node of a network which directly performs communication with the terminal In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into other forms within the scope of the technical idea of the present invention.

Occasionally, to avoid obscuring the concept of the present invention, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE system, and 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

FIG. 1 is a diagram for a schematic structure of an LTE system. Referring to FIG. 1, an LTE system structure can be mainly divided into an E-UTRAN (evolved UMTS terrestrial radio access network) and an EPC (evolved packet core). The E-UTRAN consists of a UE (user equipment, terminal) and an eNB (evolved NodeB, base station). A space between the UE and the eNB is called a Uu interface and a space between the eNB and the eNB is called an X2 interface. The EPC consists of an MME (mobility management entity) in charge of a control plane function and an S-GW (serving gateway) in charge of a user plane function. A space between the eNB and the MME is called an S1-MME interface. A space between the eNB and the S-GW is called an S1-U interface. And, the two interfaces may be commonly called an S1 interface.

Figure 3:
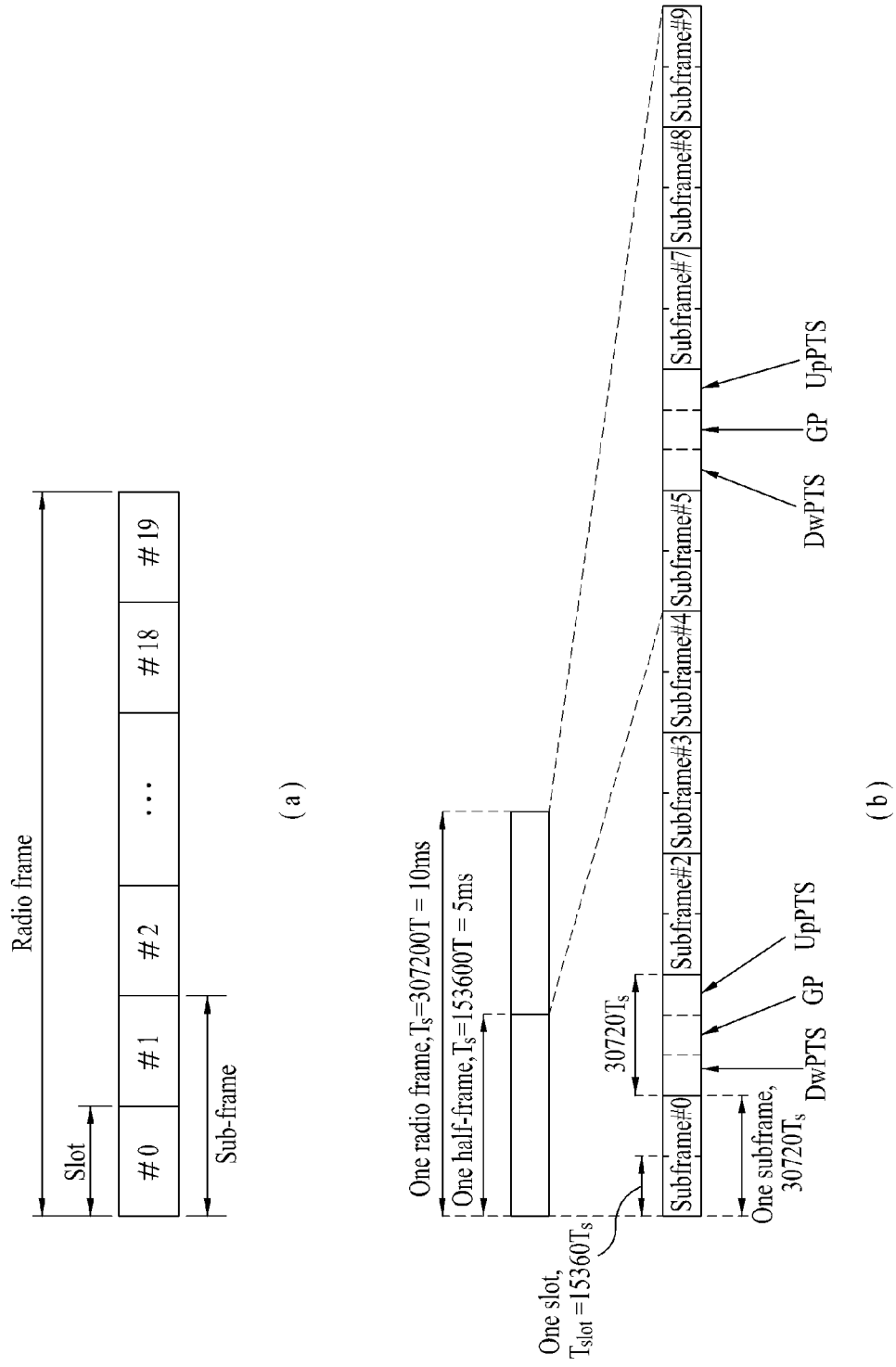
FIG. 3 is a diagram for a structure of a radio frame.

A radio interface protocol is defined in the Uu interface that is a radio interval. The radio interface protocol horizontally includes a physical layer, a data link layer and a network layer. And, the radio interface protocol is vertically divided into a user plane for user data transportation and a control plane for signaling (e.g., control signal) delivery. Based on the 3 lower layers of an open system interconnection (OSI) reference model known in communication systems widely and generally, as shown in FIG. 2 and FIG. 3, the radio interface protocol can be divided into L1 (i.e., first layer) including a physical layer PHY, L2 (i.e., second layer) including MAC/RLC/PDCP (medium access control/radio link control/packet data convergence protocol) layer, and L3 (i.e., $3^{rd}$ layer) including RRC (radio resource control) layer. These protocol layers exist as pairs in UE (user equipment) and E-UTRAN and are responsible for data transportations of the Uu interface.

FIG. 2 is a diagram to describe layers of a radio protocol, in which a control plane and a user plane are shown. The respective layers are described in detail with reference to FIG. 2 as follows. First of all, a physical (PHY) layer (i.e., first layer) provides an information transfer service to an upper layer using a physical channel. The PHY layer is connected to a medium access control (MAC) layer above through a transport channel. And, data is transported between the MAC layer and the PHY layer through the transport channel. In this case, the transport channel can be categorized into a dedicated transport channel or a common transport channel depending on whether a channel is shared. And, data is transported between different PHY layers, i.e., a PHY layer of a transmitting side and a PHY layer of a receiving side, through a physical channel using a radio resource.

Various layers exist in the second layer as follows. First of all, a medium access control (MAC) layer plays a role in mapping various logical channels to various transport channels, respectively. And, the MAC layer is also responsible for logical channel multiplexing of mapping various logical channels to a single transport channel. The MAC layer is connected to a radio link control (RLC) layer, which is an upper layer, through a logical channel. And, the logical channel is mainly categorized into a control channel for transporting information of a control plane or a traffic channel for transporting information of a user plane depending on a type of the transported information.

A radio link control (RLC) layer of the second layer plays a role in adjusting a data size suitable for a lower layer to transmit data in a radio interval by performing segmentation and concatenation on data received from an upper layer. In order to secure various QoS requested by each radio bearer (hereinafter abbreviated RB), three kinds of operating modes, i.e., TM (transparent mode), UM (un-acknowledged mode) and AM (acknowledged mode) are provided. In particular, the AM RLC layer performs a retransmission function through ARQ (automatic repeat and request) function for the reliable data transmission.

A packet data convergence protocol (PDCP) layer of the second layer performs a header compression function for reducing an IP packet header size, which is relatively big and carries unnecessary control information, to efficiently transmit such an IP packet as IPv4, IPv6 and the like in a radio interval having a narrow bandwidth. This plays a role in increasing transmission efficiency of a radio interval by transmitting information mandatory for a header part of data only. Moreover, in LTE system, the PDCP layer also performs a security function that includes ciphering for preventing a data wiretap conducted by a stranger and integrity protection for preventing data manipulation conducted by a third party.

A radio resource control (RRC) layer situated at the top of the $3^{rd}$ layer is defined in a control plane only. The RRC layer is responsible for controlling logical channels, transport channels and physical channels in association with configuration, reconfiguration and release of radio bearers (hereinafter abbreviated RBs). In this case, the radio bearer (RB) means a logical path provided by the first and second layers of the radio protocol for the data transfer between a UE and a UTRAN. Generally, configuring RB means a process for regulating properties of a radio protocol layer and channel required for providing a specific service and setting detailed parameters and operating methods thereof. The RB is categorized into SRB (signaling RB) or DRB (data RB) again. In particular, the SRB is used as a passage for sending an RRC message in a control plane, while the DRB is used as a passage for transporting user data in a user plane.

A structure of a downlink radio frame is described with reference to FIG. 3 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 3(a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of cyclic prefix (CP). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel state is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 3(b) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink. Meanwhile, one subframe includes 2 slots irrespective of the type of the radio frame.

The above-described structures of the radio frame are just exemplary. And, the number of subframes included in a radio frame, the number of slots included in the subframe and the number of symbols included in the slot may be modified in various ways.

Figure 4:
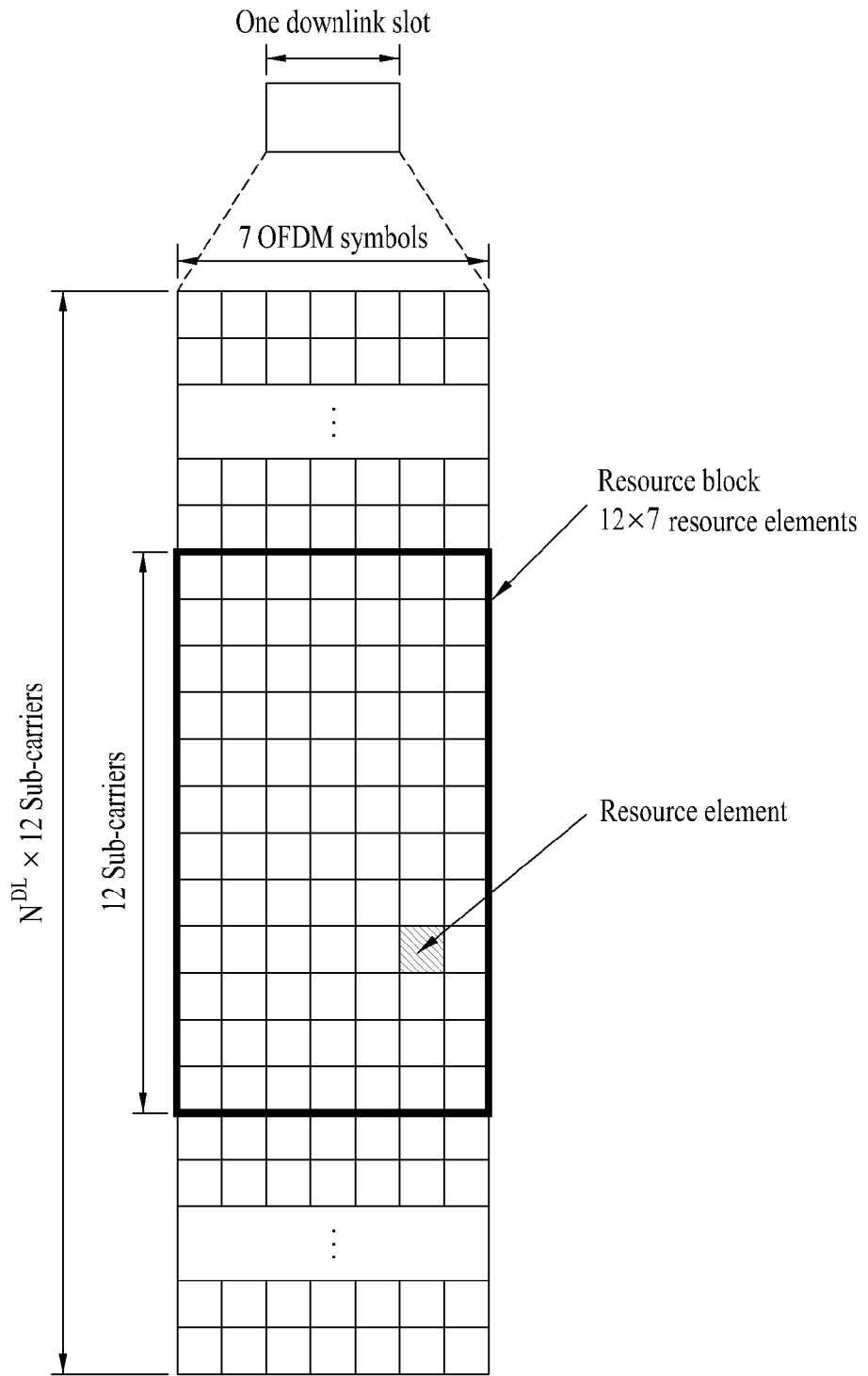
FIG. 4 is a diagram of a resource grid in a downlink slot.

FIG. 4 is a diagram of a resource grid in a downlink (DL) slot. Referring to FIG. 4, one downlink (DL) slot may include 7 OFDM symbols and one resource block (RB) may include 12 subcarriers, by which the present invention may be non-limited. For instance, in case of a normal cyclic prefix (CP), one slot includes 7 OFDM symbols. Yet, in case of an extended CP, one slot may include 6 OFDM symbols. Each element on a resource grid may be named a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 5:
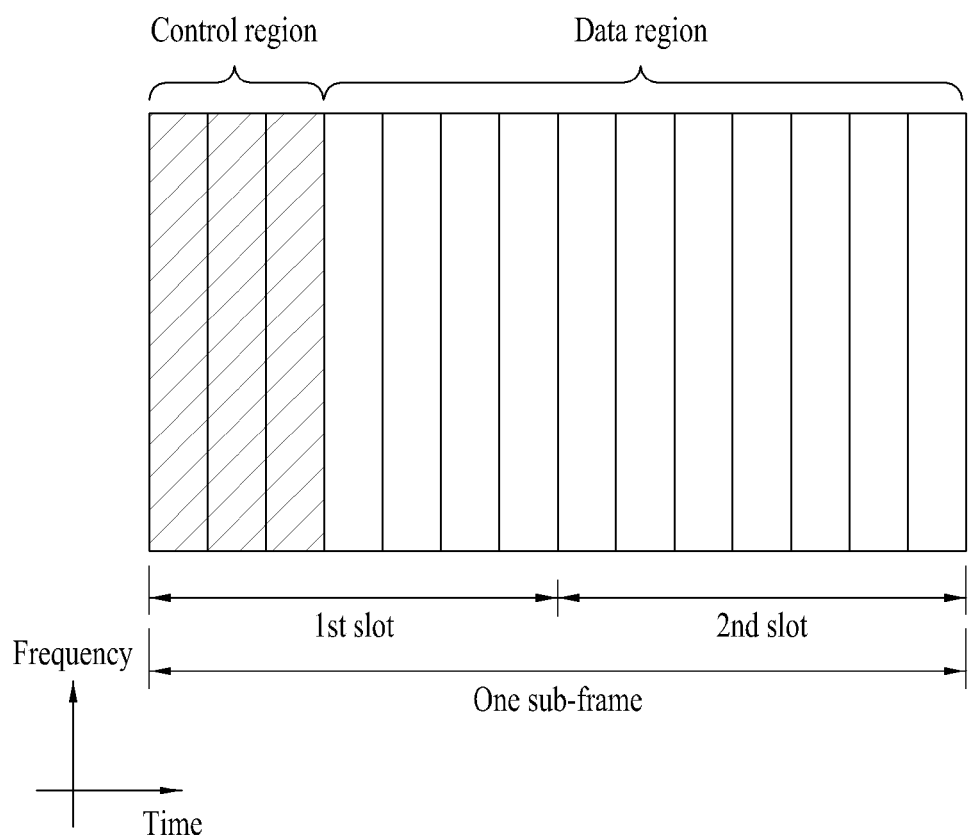
FIG. 5 is a diagram for a structure of a downlink subframe.

FIG. 5 is a diagram for a structure of a downlink (DL) subframe. Maximum 3 OFDM symbols situated in a head part of a first slot of one subframe correspond to a control region to which a control channel is allocated. The rest of OFDM symbols correspond to a data region to which PDSCH (physical downlink shared channel) is allocated. A basic unit of transmission becomes one subframe. In particular, PDCCH and PDSCH are assigned across 2 slots. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment) group. The PDCCH may include transmission format and resource allocation information of DL-SCH (downlink shared channel), resource allocation information on UL-SCH (uplink shared channel), paging information on PCH (paging channel), system information on DL-SCH, resource allocation of such a higher layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment may be able to monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel state. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIB)), the CRC may be masked with a system information identifier and a system information RNTI (SI-RNTI). In order to indicate a random access response to a transmission of a random access preamble of a user equipment, the CRC may be masked with RA-RNTI (random access-RNTI).

Figure 6:
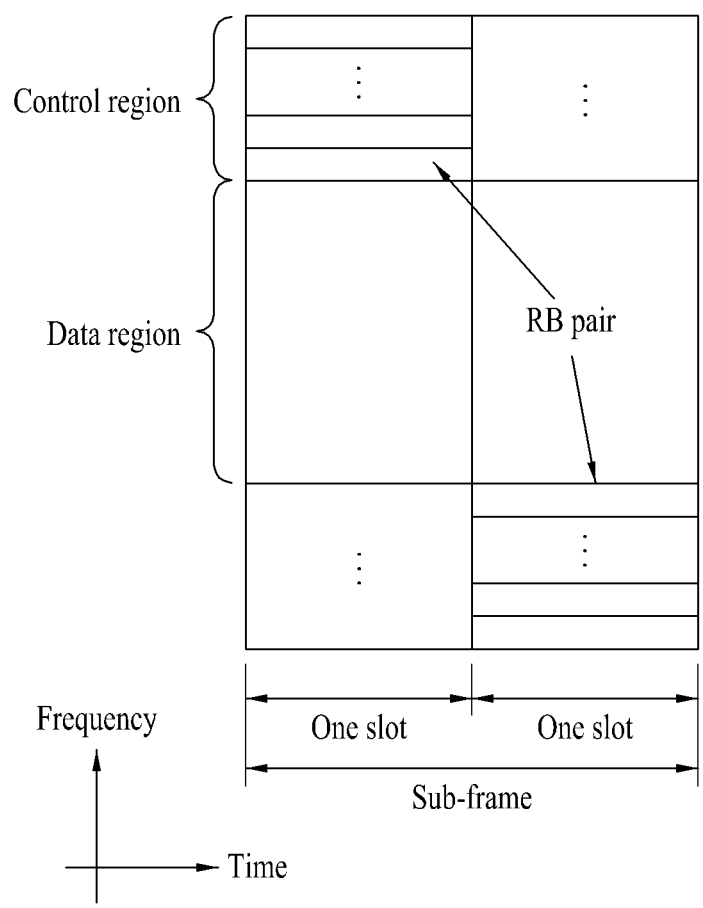
FIG. 6 is a diagram for a structure of an uplink subframe.

FIG. 6 is a diagram for a structure of an uplink (UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair) in subframe. Resource blocks belonging to the resource block pair may occupy different subcarriers for 2 slots, which can be expressed as a resource block pair allocated to PUCCH frequency-hop a slot boundary.

In the following description, a random access procedure in LTE system is explained with reference to FIG. 7 and FIG. 8.

First of all, a user equipment performs an random access procedure in the event of one of the following cases.

Case that a user equipment performs an initial access without a connection (e.g., RRC connection) to a base station Case that a user equipment initially accesses a target cell by a handover procedure Case requested by a command given by a base station Case that data in uplink is generated in a situation that an uplink time synchronization is not matched or a radio resource used to request a radio resource is not allocated Case of a recovery process in case of a radio link failure (RLF) or a handover failure In LTE system, a non-contention based random access procedure is provided as follows. First of all, a base station assigns a dedicated random access preamble designated to a specific user equipment. Secondly, the corresponding user equipment performs a random access procedure using the random access preamble. So to speak, in a process for selecting a random access preamble, there are a contention based random access procedure and a non-contention based random access procedure. In particular, according to the contention based random access procedure, a user equipment randomly selects one random access preamble from a specific set and then uses the selected random access preamble. According to the non-contention based random access procedure, a random access preamble assigned by a base station to a specific user equipment only is used. Differences between the two kinds of the random access procedures lie in a presence or non-presence of occurrence of a contention problem. The non-contention based random access procedure can be used, as mentioned in the foregoing description, only if a handover process is performed or it is requested by a command given by a base station.

Figure 7:
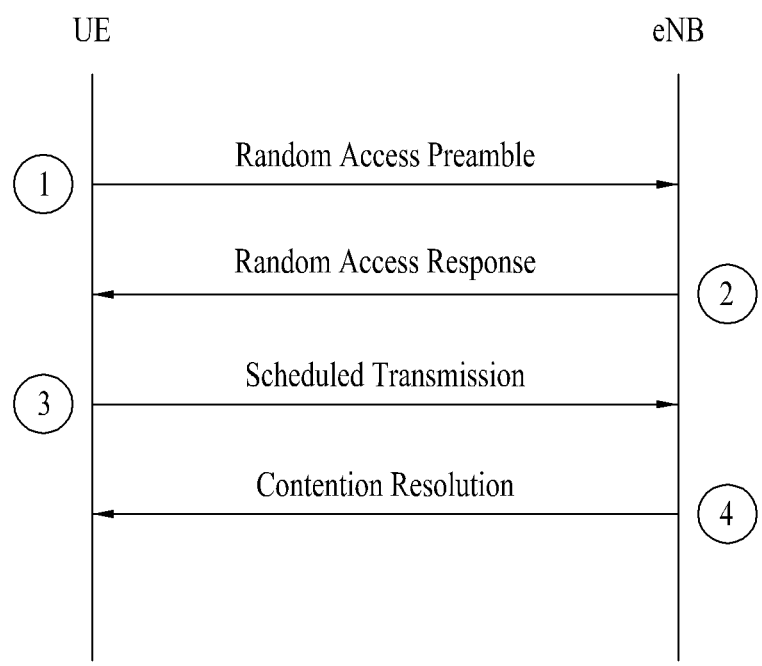
FIG. 7 is a diagram to describe a contention based random access procedure.

FIG. 7 is a diagram to describe a contention based random access procedure.

In a contention based random access procedure, a user equipment randomly selects a random access preamble from a set of random access preambles indicated through a system information or a handover command, selects a PRACH (physical RACH) resource capable of carrying the selected random access preamble, and then transmits the corresponding random access preamble through the selected resource.

After the user equipment has transmitted the random access preamble in the above manner, it attempts a reception of its random access response within a random access response receiving window indicated through the system information or the handover command from a base station. In particular, the random access response information is transmitted in format of MAC PDU. And, the MAC PDU is delivered through PDSCH (physical downlink shared channel). In order for the user equipment to appropriately receive the information delivered through the PDSCH, PDCCH is delivered as well. In particular, information on the user equipment supposed to receive the PDSCH, frequency and time information of a radio resource of the PDSCH, a transmission format of the PDSCH and the like are included in the PDCCH. Once the user equipment successfully receives the PDCCH transmitted to itself, the user equipment appropriately receives a random access response transmitted on the PDSCH according to the informations of the PDCCH. And, in the random access response, a random access preamble identifier (ID), a UL grant (UL radio resource), a temporary cell identifier (temporary C-RNTI) and time alignment commands (time synchronization correction values, hereinafter abbreviated TAC) are included. As mentioned in the above description, the random access preamble identifier is required for the random access response. The reason for this is described as follows. First of all, since random access response information for at least one or more user equipments may be included in a single random access response, it is necessary to notify that the UL grant, the temporary C-RNTI and the TAC are valid for which one of the user equipments. And, the random access preamble identifier matches the random access preamble selected by the user equipment in a step 1.

If the user equipment receives the random access response valid for itself, the user equipment individually processes each of the informations included in the received random access response. In particular, the user equipment applies the TAC and saves the temporary C-RNTI. Moreover, the user equipment transmits a data saved in its buffer or a newly generated data to the base station using the received UL grant. In this case, the data included in the UL grant should contain an identifier of the user equipment. In the contention based random access procedure, the base station is unable to determine what kinds of user equipments perform the random access procedure. Hence, in order to resolve the contention in the future, the base station should identify the corresponding user equipment. The identifier of the user equipment can be included by one of two kinds of methods as follows. First of all, if the user equipment has a valid cell identifier previously assigned by a corresponding cell prior to the random access procedure, the user equipment transmits its cell identifier through the UL grant. On the contrary, if the user equipment fails in receiving the valid cell identifier prior to the random access procedure, the user equipment transmits its unique identifier (e.g., S-TMSI, Random Id, etc.) inclusively. In general, the unique ID is longer than a cell identifier. If the user equipment transmits the data through the UL grant, the user equipment initiates a timer for contention resolution (hereinafter called a contention resolution timer).

After the user equipment has transmitted the data containing its identifier through the UL grant included in the random access response, it waits for an indication from the base station for the contention resolution. In particular, the user equipment attempts a reception of the PDCCH in order to receive a specific message. In receiving the PDCCH, there are two kinds of methods. As mentioned in the foregoing description, if the user equipment's identifier transmitted through the UL grant is the cell identifier, the user equipment attempts a reception of the PDCCH using its cell identifier. If the identifier is the unique identifier, the user equipment attempts the reception of the PDCCH using the temporary C-RNTI included in the random access response. Thereafter, in the former case, if the user equipment receives the PDCCH through its cell identifier before the expiration of the contention resolution timer, the user equipment determines that the random access procedure has been normally performed and then ends the random access procedure. In the latter case, if the user equipment receives the PDCCH through the temporary cell identifier before the expiration of the contention resolution timer, the user equipment checks data delivered by the PDSCH indicated by the PDCCH. If the unique identifier of the user equipment is included in the substance of the data, the user equipment determines that the random access procedure has been normally performed and then ends the random access procedure.

Figure 8:
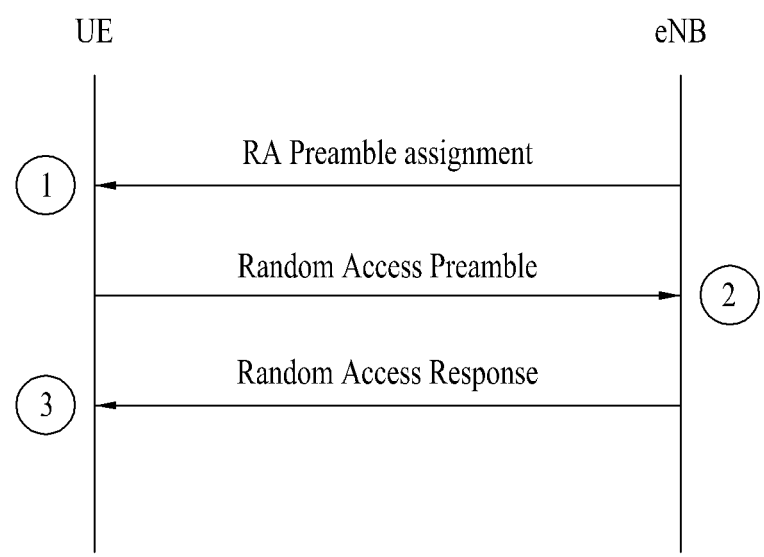
FIG. 8 is a diagram to describe a non-contention based random access procedure.

FIG. 8 is a diagram to describe a non-contention based random access procedure. Unlike the contention based random access procedure, in a non-contention based random access procedure, if a random access response information is received, a random access procedure is ended by determining that the random access procedure has been normally performed. The non-contention based random access procedure may exist in one of the two cases (i.e., a first case of a handover process and a second case requested by a command given by a base station). Of course, a contention based random access procedure can be performed in one of the two cases. First of all, for a non-contention based random access procedure, it is important to receive a designated random access preamble having no possibility in contention from a base station. The random access preamble can be indicated by a handover command or a PDCCH command. After the base station has assigned the random access preamble designated only to the user equipment, the user equipment transmits the preamble to the base station.

In the following description, based on the above descriptions, a random access method for a case of sending an instant message is described. For reference, in a random access procedure described in the following, the description of the former random access procedure in the LTE/LTE-A system can be included as references/configurations except the especially mentioned description.

An instant message is schematically described as follows. Packets generated from an instant message service have the following features. First of all, a packet is configured in a small size with 100 bytes (UL) or 300 bytes (DL) on average. A generated time difference between packets is diversely distributed between 2 seconds and 2 minutes and has a value between 10 seconds and 15 seconds on average. Thus, in case of an instant messaging service, since the generation interval between packets is very diverse, a base station can release an RRC connection of a user equipment after completion of a transmission/reception of a single instant messaging packet to/from the user equipment. Yet, in doing so, if a next packet is generated, since the RRC connection between the base station and the user equipment needs to be established again, a signaling overhead for the RRC connection reestablishment increases.

In order to supplement it, the RRC connection to the user equipment can be maintained after the packet transmission/reception to/from the user equipment. Yet, since the user equipment should send such a control signal as a DL or UL channel state reporting to the base station periodically in order to maintain the RRC connection and the UL time synchronization, the power consumption of the user equipment increases.

Therefore, despite that the user equipment maintains the RRC connection, the base station can manage the user equipment not to maintain the UL time synchronization after completion of a single packet transmission. Yet, when a UL instant messaging packet is generated, even if the user equipment failing in UL time synchronization transmits a random access preamble to the base station, since the base station is unable to determine whether the random access preamble is provided for a transmission of the instant messaging packet, the instant messaging packet is unable to optimize a UL grant included in a random access response message. Hence, it causes a problem that a delay time and a signaling overhead are generated. According to an embodiment of the present invention mentioned in the following description, a base station sorts out random access preambles by groups and then provides a user equipment with mapping information between a radio bearer and each group. If the user equipment needs a random access procedure in accordance with a generation of data to be transmitted to the base station, the user equipment selects a random access preamble from the random access preamble group mapped to the radio bearer of the data and then transmits the selected random access preamble to the base station.

Figure 9:
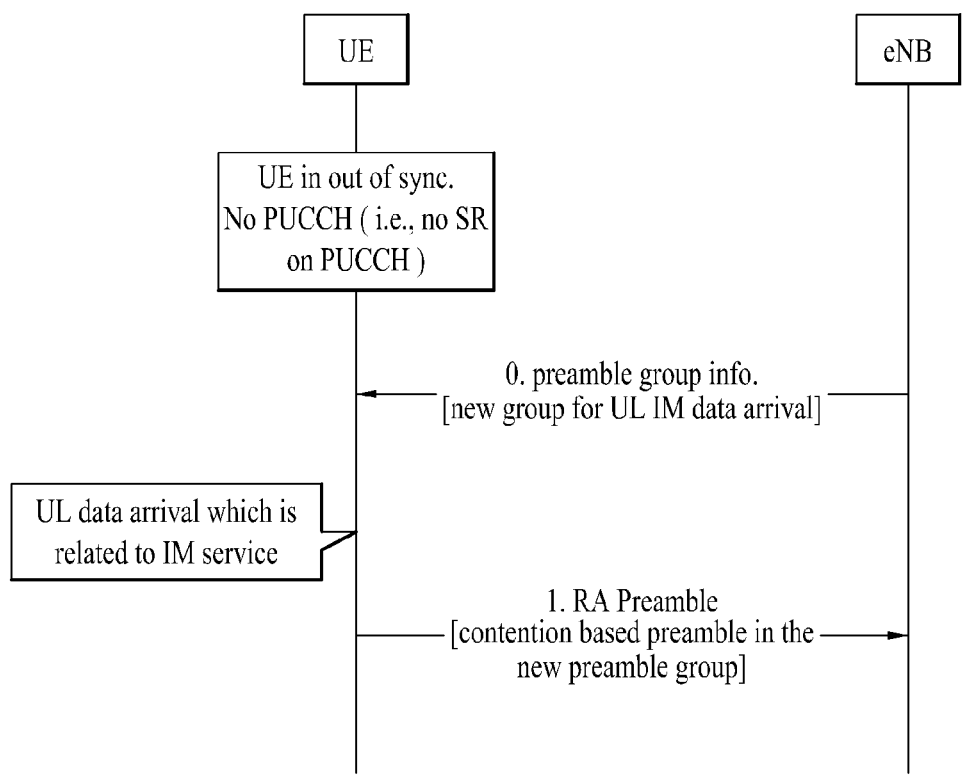
FIG. 9 is a diagram to describe a random access procedure according to and embodiment of the present invention.
Figure 10:
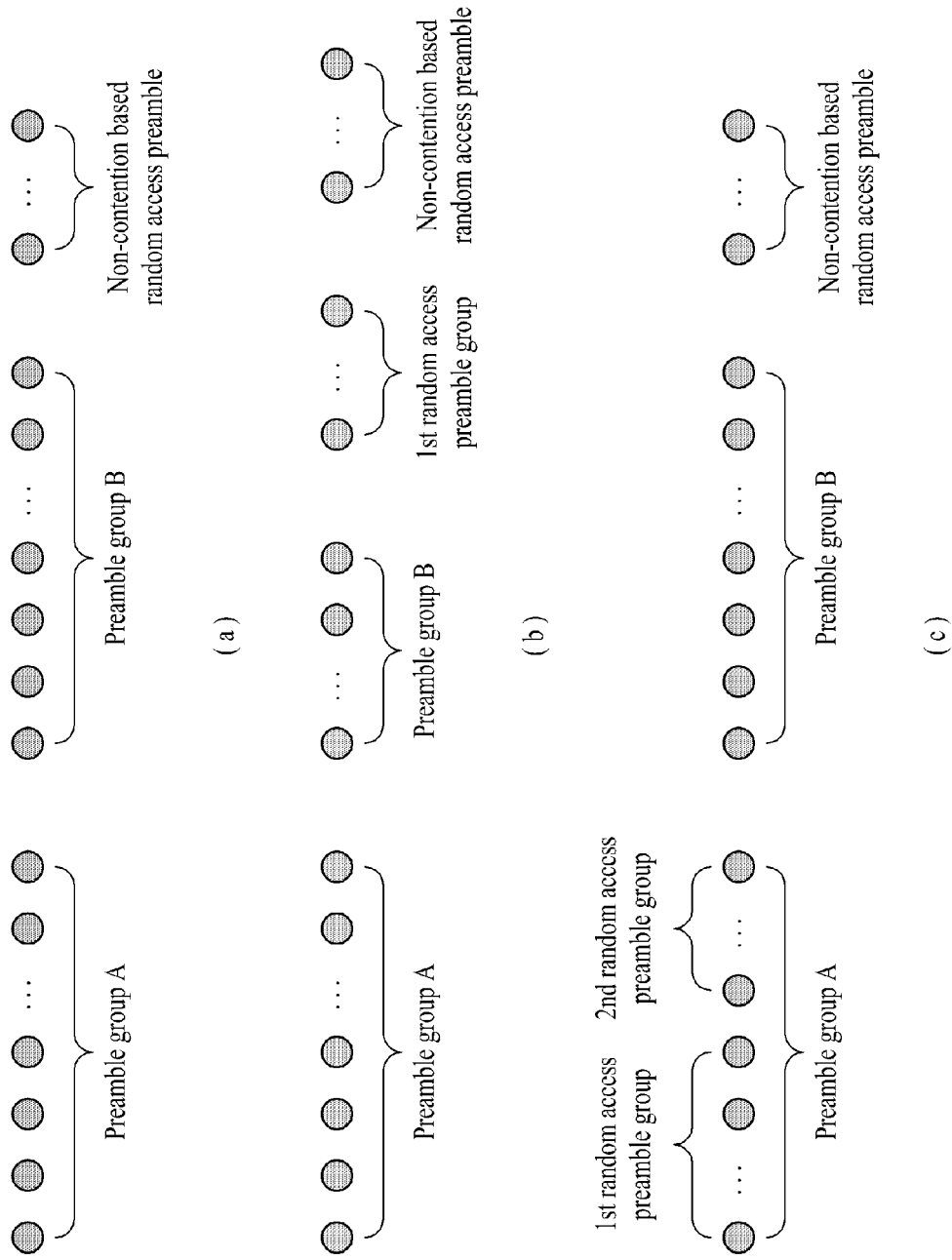
FIG. 10 is a diagram to describe a random access preamble grouping according to an embodiment of the present invention.

FIG. 9 is a diagram to describe a random access procedure according to and embodiment of the present invention. Referring to FIG. 9, a user equipment receives information on a group of random access preambles from a base station. In this case, the information on the group of the random access preambles may include information on associated relationship among a random access preamble group (e.g., a first random access preamble group and a second random access preamble group), a radio bearer and a packet type. In particular, if the random access preambles (particularly, random access preambles for a contention based random access) are sorted into two groups, the first random access preamble group may be associated/mapped with a first radio bearer for transmitting an instant message packet and the second random access preamble group may be associated/mapped with a second radio bearer for transmitting a packet different from the instant message packet. In this case, the first random access preamble group and the second random access preamble group can be configured in a manner of being independent from or associated with an existing random access preamble group grouped by a size of a packet to be transmitted in the LTE/LTE-A system. For instance, groups can be provided as examples shown in FIG. 10. FIG. 10(a) shows random access preamble groups (i.e., preamble group A, preamble group B) divided by sizes of data to be transmitted in the existing LTE/LTE-A system. In addition to the two random access preamble groups divided by the existing packet sizes shown in FIG. 10(a), it is able to configure a first random access preamble group for an instant message packet and a second random access preamble group for a packet different from the instant message packet. In this case, referring to FIG. 10(b), the second random access preamble group can include the existing random access preamble groups A and B. Alternatively, referring to FIG. 10(c), in the random access preamble group A for a small packet among the existing random access preamble groups divided by the packet sizes, a first random access preamble group for an instant message packet and a second random access preamble group for a packet different from the instant message packet can be configured [i.e., 3 random access preamble groups].

The information on the random access preamble group can be delivered to the user equipment through PDCCH signal, MAC signal or RRC signal. In case that the information is delivered through the RRC signal, the base station can broadcast the information within a cell.

Referring now to FIG. 9, if a packet to be transmitted to the base station by the user equipment is generated, it can be transmitted to the base station in a manner that a random access preamble is selected from one of the random access preamble groups mentioned in the above description. In doing so, the transmission of the random access preamble may correspond to a case that PUCCH resource for making a radio resource request is not configured for the user equipment. In another aspect, i) if data of a radio bearer is generated when RLC and PDCP transmitting buffer of a user equipment is empty or ii) if data of a radio bearer is generated despite that RLC and PDCP transmitting buffer of a user equipment is not empty and the radio bearer has a priority higher than that of another radio bearer of data saved in a transmitting buffer of the user equipment, the user equipment can select and transmit a random access preamble to a base station.

The selection of the random access preamble may be performed in a manner that the user equipment selects/determines a random access preamble group depending on a packet type to transmit and then transmits one of random access preambles included in the selected group. In this case, it is able to perform the selection/determination of the random access preamble using the aforementioned information of the group of the random access preambles. For instance, when an instant messaging packet is generated, if the user equipment determines that a random access procedure is necessary, the user equipment selects a first random access preamble group mapped with a radio bearer for transmitting the instant messaging packet, selects one random access preamble randomly, and is then able to transmit the selected random access preamble to the base station. Likewise, if a packet other than an instant messaging packet is selected, the user equipment selects a second random access preamble group and is then able to transmit a random one of random access preambles belonging to the selected group.

The base station receives the random access preamble transmitted from the user equipment. In this case, the base station can figure out that the random access preamble transmitted by the user equipment belongs to which random access preamble group. As mentioned in the foregoing description, the random access preamble group can be categorized into a group mapped to a radio bearer for an instant message transmission or a group not mapped thereto. Hence, the base station can recognize that the received random access preamble is provided for the instant message packet transmission. Therefore, the base station optimizes a UL grant depending on a packet type that can be confirmed from the random access preamble and is then able to transmit the UL grant to the user equipment through a random access response. So to speak, in case that the user equipment transmits the random access preamble selected from the first random access preamble group for the instant message transmission, the base station allocates a UL resource optimized for the instant message and is then able to transmit it to the user equipment as a random access response. Therefore, in the instant message transmission, a random access procedure may be performed more efficiently than an existing random access procedure.

Figure 11:
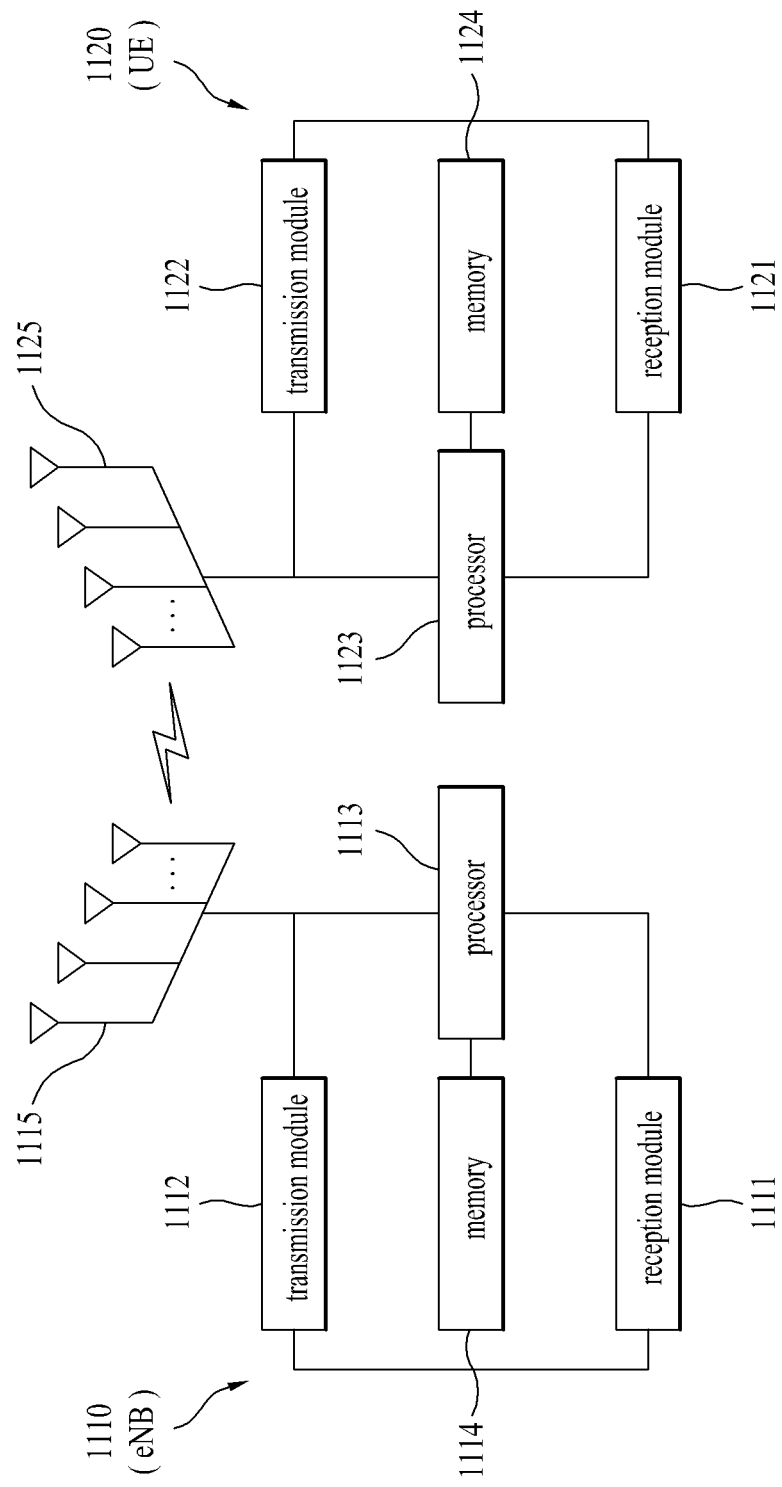
FIG. 11 is a diagram for configurations of a transceiving device according to an embodiment of the present invention.

FIG. 11 is a diagram for configurations of a transceiving device according to an embodiment of the present invention.

Referring to FIG. 11, a base station device 1110 according to the present invention may include a receiving module 1111, a transmitting module 1112, a processor 1113, a memory 1114 and a plurality of antennas 1115. In this case, a plurality of the antennas 1115 may mean a base station device that supports MIMO transmission and reception. The receiving module 1111 may be able to receive various signals, data, information and the like in uplink from a user equipment. The transmitting module 1112 may be able to transmit various signals, data, information and the like in DL to the user equipment. Moreover, the processor 1113 may be configured to control overall operations of the base station device 1110.

The processor 1113 of the base station device 1110 according to one embodiment of the present invention can operate to implement the aforementioned embodiments. The processor 1113 of the base station device 1110 performs a function of operating information received by the base station device 1110, information to be externally transmitted and the like. The memory 1114 may store the operated information and the like for prescribed duration and may be substituted with such a component as a buffer (not shown in the drawing) and the like.

Referring to FIG. 11, a user equipment device 1120 according to the present invention may include a receiving module 1121, a transmitting module 1122, a processor 1123, a memory 1124 and a plurality of antennas 1125. In this case, a plurality of the antennas 1125 may mean a user equipment device that supports MIMO transmission and reception. The receiving module 1121 may be able to receive various signals, data, information and the like in downlink from the base station. The transmitting module 1122 may be able to transmit various signals, data, information and the like in UL to the base station. Moreover, the processor 1123 may be configured to control overall operations of the user equipment device 1120.

The processor 1123 of the user equipment device 1120 according to one embodiment of the present invention can operate to implement the aforementioned embodiments. The processor 1123 of the user equipment device 1120 performs a function of operating information received by the user equipment device 1120, information to be externally transmitted and the like. The memory 1124 may store the operated information and the like for prescribed duration and may be substituted with such a component as a buffer (not shown in the drawing) and the like.

The detailed configurations of the base station device and the user equipment device mentioned in the above description may be implemented in a manner that the matters of the various embodiments of the present invention mentioned in the foregoing description are independently applicable or that at least two of the various embodiments of the present invention are simultaneously applicable. And, duplicate contents may be omitted for clarity.

Moreover, in the description with reference to FIG. 11, the description of the base station device 1110 may be identically applicable to a relay device as a DL or UL transmitting entity and the description of the user equipment device 1120 may be identically applicable to a relay device as a DL or UL transmitting entity.

Embodiments of the present invention may be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description may be applicable to various kinds of mobile communication systems.

What is claimed is:

1. A method of performing a random access by a user equipment in a wireless communication system, the method comprising:
    transmitting a random access preamble selected from either a first random access preamble group or a second random access preamble group to a base station,
    wherein each of the first random access preamble group and the second random access preamble group is discriminated depending on a packet type to be transmitted by the user equipment,
    wherein the first random access preamble group is associated with a first radio bearer for transmitting an instant message packet, and
    wherein the second random access preamble group is associated with a second radio bearer for transmitting a packet other than the instant message packet.

2. The method of claim 1, further comprising:
    receiving information on associated relationship among the first random access preamble group, the second random access preamble group, a radio bearer and the packet type from the base station.

3. The method of claim 1, further comprising:
selecting a random access preamble group for selecting the random access preamble depending on the packet type to be transmitted by the user equipment.

4. The method of claim 1, wherein
if a RLC (radio link control) layer buffer and a PDCP (packet data convergence protocol) layer buffer are empty and a packet associated with the radio bearer to be transmitted by the user equipment is identified, or
if a priority of the radio bearer associated with the packet to be transmitted by the user equipment is higher than that of a radio bearer for a packet in the RLC layer buffer and the PDCP layer buffer,
the user equipment starts to perform the random access.

5. A method of performing a random access by a base station in a wireless communication system, the method comprising:
receiving a random access preamble from a user equipment,
wherein the random access preamble corresponds to either a first random access preamble group or a second random access preamble group,
wherein each of the first random access preamble group and the second random access preamble group is discriminated depending on a packet type to be transmitted by the user equipment,
wherein the first random access preamble group is associated with a first radio bearer for transmitting an instant message packet, and
wherein the second random access preamble group is associated with a second radio bearer for transmitting a packet other than the instant message packet.

6. The method of claim 5, further comprising:
transmitting information on associated relationship among the first random access preamble group, the second random access preamble group, a radio bearer and the packet type to the user equipment.

7. The method of claim 5, wherein a random access preamble group for selecting the random access preamble is selected depending on the packet type to be transmitted by the user equipment.

8. The method of claim 5, wherein if a RLC (radio link control) layer buffer and a PDCP (packet data convergence protocol) layer buffer are empty and a packet associated with the radio bearer to be transmitted by the user equipment is identified, or
if a priority of the radio bearer associated with the packet to be transmitted by the user equipment is higher than that of a radio bearer for a packet in the RLC layer buffer and the PDCP layer buffer,
the random access preamble is received.

9. A user equipment in a wireless communication system, comprising:
a transceiver; and
a processor coupled to the transceiver and configured to:
transmit a random access preamble selected from either a first random access preamble group or a second random access preamble group to a base station,
wherein each of the first random access preamble group and the second random access preamble group is discriminated depending on a packet type to be transmitted by the user equipment,
wherein the first random access preamble group is associated with a first radio bearer for transmitting an instant message packet, and
wherein the second random access preamble group is associated with a second radio bearer for transmitting a packet other than the instant message packet.

10. A base station in a wireless communication system, comprising:
a transceiver; and
a processor operatively connected to the transceiver and configured to:
receiver a random access preamble from a user equipment,
wherein the random access preamble corresponds to either a first random access preamble group or a second random access preamble group,
wherein each of the first random access preamble group and the second random access preamble group is discriminated depending on a packet type to be transmitted by the user equipment,
wherein the first random access preamble group is associated with a first radio bearer for transmitting an instant message packet, and
wherein the second random access preamble group is associated with a second radio bearer for transmitting a packet other than the instant message packet.

* * * * *